(12) United States Patent
Henderson et al.

(10) Patent No.: US 11,743,147 B2
(45) Date of Patent: Aug. 29, 2023

(54) POST INCIDENT REVIEW

(71) Applicant: ServiceNow, Inc., Santa Clara, CA (US)

(72) Inventors: Lisa Henderson, Temecula, CA (US); Eric Schroeder, San Diego, CA (US); Bryan Boyle, San Diego, CA (US); Myke Lyons, Haworth, NJ (US)

(73) Assignee: ServiceNow, Inc., Santa Clara, CA (US)

(*) Notice: Subject to any disclaimer, the term of this patent is extended or adjusted under 35 U.S.C. 154(b) by 767 days.

(21) Appl. No.: 16/218,315

(22) Filed: Dec. 12, 2018

(65) Prior Publication Data

US 2019/0230006 A1 Jul. 25, 2019

Related U.S. Application Data

(63) Continuation of application No. 15/087,001, filed on Mar. 31, 2016, now Pat. No. 10,181,984.

(Continued)

(51) Int. Cl.
*H04L 41/5067* (2022.01)
*G06Q 30/0203* (2023.01)
(Continued)

(52) U.S. Cl.
CPC ..... *H04L 41/5067* (2013.01); *G06Q 30/0203* (2013.01); *H04L 41/5074* (2013.01); *H04L 67/02* (2013.01)

(58) Field of Classification Search
CPC ............ H04L 41/5067; H04L 41/5074; G06Q 30/0203

(Continued)

(56) References Cited

U.S. PATENT DOCUMENTS 6,609,122 B1 8/2003 Ensor
6,678,887 B1 1/2004 Hallman
(Continued)

OTHER PUBLICATIONS

Grenman, Thomas; "Autoreporter—Keeping the Finnish Network Space Secure", ENISA Quarterly Review, Best Practices Contest 2009, CERT Coordination Center and the Forum of Incident Response and Security Teams (FIRST) 2009 FIRST Annual Conference, 4 pp.
(Continued)

*Primary Examiner* — Vivek Srivastava
*Assistant Examiner* — Hien V Doan
(74) *Attorney, Agent, or Firm* — Fletcher Yoder, PC

(57) ABSTRACT

A post incident analysis system and method includes a system management module coupled to a communications link and digital data storage containing a database of multiple survey questions, each question associated with an application criteria statement and auto populate instructions. The module conducts post incident analysis responsive to a network incident. After the incident receives a given status, the module generates a post incident survey. Survey questions are identified by applying the application criteria statement associated with each question. The module pre-completes selected ones of the identified survey questions by executing the auto populate instructions associated with the selected survey question to identify and retrieve answers to the question from predefined data sources specified in the auto populate instructions. The post incident survey includes, at minimum, survey questions for which the pre-completion was not successful. The survey is transmitted to the participants via the link.

20 Claims, 9 Drawing Sheets

Related U.S. Application Data

(60) Provisional application No. 62/209,042, filed on Aug. 24, 2015.

(51) Int. Cl.
*H04L 41/5074* (2022.01)
*H04L 67/02* (2022.01)

(58) Field of Classification Search
USPC .......................................................... 709/224
See application file for complete search history.

(56) References Cited

U.S. PATENT DOCUMENTS

| | | |
|---|---|---|
| 6,816,898 B1 | 11/2004 | Scarpelli |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 3,051,164 A1 | 11/2011 | Peuter |
| 8,224,683 B2 | 7/2012 | Manos |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 8,983,982 B2 | 3/2015 | Rangarajan |
| 9,239,857 B2 | 1/2016 | Trinon |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,792,387 B2 | 10/2017 | George |
| 9,818,729 B1 | 11/2017 | Moon |
| 2007/0294258 A1* | 12/2007 | Caldwell ................. G06Q 10/10 |
| 2012/0078662 A1* | 3/2012 | Olivarez ................. G16H 15/00 705/3 |
| 2013/0036413 A1* | 2/2013 | Venkatesan ............... G06F 8/65 717/172 |

OTHER PUBLICATIONS

Co3systems, Company Overview, "Automated Incident Response. Cyber Intrusion, malware outbreak, privacy breach, DDoS attack __ _we've got a plan for that", www.co3sys.com, date unknown, 2 pp.

Ford, Paul Mason; Global Information Assurance Ceilification Paper, "Incident Reporting & Automation", Copyright SANS Institute, Global Information Assurance Certification, SANS Institute 2000-2002, 11 pp.

\* cited by examiner

| SURVEY QUESTION DB | | |
|---|---|---|
| QUESTION 416.1A | APPLICATION CRITERIA STMT 416.1B | AUTO POPULATE INSTRUCTIONS 416.1C |
| QUESTION 416.2A | APPLICATION CRITERIA STMT 416.2B | AUTO POPULATE INSTRUCTIONS 416.2C |
| ... | ... | ... |
| QUESTION 416.nA | APPLICATION CRITERIA STMT 416.nB | AUTO POPULATE INSTRUCTIONS 416.nC |

POST INCIDENT REVIEW

CROSS REFERENCE TO RELATED APPLICATIONS

This is a continuation application of U.S. application Ser. No. 15/087,001, filed Mar. 31, 2016; which claims the benefit of U.S. Provisional Application No. 62/209,042, filed Aug. 24, 2015, entitled, "Post Incident Review", herein incorporated by reference.

TECHNICAL FIELD

The present disclosure relates to computer-implemented techniques and systems for post incident review.

BACKGROUND

Communication networks are a tool for sharing information and processing capacity among many computers. These networks, which are increasingly reliant on sophisticated hardware and software resources, enable people to perform many computing tasks that would be impracticable or impossible without them.

Despite the benefits of these networks, they are not infallible, and errors can and do occur. In information technology nomenclature, an incident refers to an unplanned failure of a component or service, which disrupts or degrades the provision of services. In a communications network, incidents can result from problems with hardware components, software, firmware, or virtually any other conceivable component in the network and including human users and administrators of the network. In addition to such problems, incidents can arise from deliberate actions by hackers, malware, and viruses, as well as accidental or planned exposure of private information by human users of a network or from outside the network.

SUMMARY

Disclosed herein is a system for post-incident analysis of an incident occurring within a subject network incident associated with equipment or services of a predetermined communications network, comprising a system management module comprising a communication interface coupled to a communications link that receives incident data; and a processor programmed to perform operations based on instructions stored in a memory to conduct a post incident analysis responsive to occurrence of the subject network incident utilizing the received incident data, digital data storage accessible by the system management module, the digital data storage comprising the memory and a database of multiple survey questions, each of the multiple survey questions associated with a predetermined application criteria statement and predetermined auto populate instructions, where the system management module comprises a survey manager module comprising instructions that are executed on the processor to conduct a post incident analysis to receive machine-readable identification of designated survey participants, receive prescribed types of machine-readable data describing causes and conditions relating to the subject network incident, after receiving machine-readable notification of the subject network incident having received a particular status, conduct a post incident review to generate a post incident survey by utilizing the processor to identify survey questions to include in the post incident survey by applying the application criteria statement associated with each survey question in the survey question database, pre-complete selected ones of the identified survey questions by, for each of the selected identified survey questions, execute the auto populate instructions associated with the selected identified survey question to identify and retrieve answers to the selected identified survey question from predefined data sources specified in the auto populate instructions, store the retrieved answers in association with the post incident survey, include in the post incident survey at least the survey questions for which pre-completion did not complete, and via the communications link, transmit the post incident survey or notification thereof to receivers of the designated survey participants.

Disclosed herein is also a non-transitory computer-readable storage medium, comprising executable instructions that, when executed by a processor, facilitate performance of operations to conduct a post incident analysis responsive to occurrence of a subject network incident associated with equipment or services of a system comprising a system management module coupled to a communications link and digital data storage comprising a memory accessible by the system management module and containing a database of multiple survey questions, each of the multiple survey questions being associated with a predetermined application criteria statement and predetermined auto populate instructions, wherein the operations to conduct a post incident analysis comprise receiving machine-readable identification of designated survey participants, receiving prescribed types of machine-readable data describing causes and conditions relating to the subject network incident, after receiving machine-readable notification of the subject network incident having received a particular status, conducting a post incident review, comprising operations of generating a post incident survey by performing operations with the processor comprising identifying survey questions to include in the post incident survey by applying the application criteria statement associated with each survey question in the survey question database, pre-completing selected ones of the identified survey questions by, for each of the selected identified survey questions executing the auto populate instructions associated with the selected identified survey question to identify and retrieve answers to the selected identified survey question from predefined data sources specified in the auto populate instructions, and storing the retrieved answers in association with the post incident survey, including in the post incident survey at least the survey questions for which pre-completion did not complete, and via the communications link, transmitting the post incident survey or notification thereof to the designated survey participants.

Disclosed herein is also a method for post-incident analysis of an incident occurring within a subject network incident associated with equipment or services of a predetermined communications network, comprising providing a system management module comprising a communication interface coupled to a communications link that receives incident data, and a processor programmed to perform operations based on instructions stored in a memory to conduct a post incident analysis responsive to occurrence of the subject network incident utilizing the received incident data, digital data storage accessible by the system management module, the digital data storage comprising the memory and a database of multiple survey questions, each of the multiple survey questions associated with a predetermined application criteria statement and predetermined auto populate instructions, the method further comprising utilizing the processor for receiving, at the communication interface, machine-readable identification of designated survey participants, receiving, at the communication interface, prescribed types of machine-readable data describing causes and conditions relating to the subject network incident, after receiving machine-readable notification of the subject network incident having received a particular status, conducting a post incident review, comprising generating a post incident survey by with the processor, identifying survey questions to include in the post incident survey by applying the application criteria statement associated with each survey question in the survey question database, pre-completing selected ones of the identified survey questions comprising, with the processor, for each of the selected identified survey questions executing the auto populate instructions associated with the selected identified survey question to identify and retrieve answers to the selected identified survey question from predefined data sources specified in the auto populate instructions, storing the retrieved answers in association with the post incident survey, including in the post incident survey at least the survey questions for which pre-completion did not complete, and via the communications link, transmitting the post incident survey or notification thereof to receivers of the designated survey participants.

BRIEF DESCRIPTION OF THE DRAWINGS

The description herein makes reference to the accompanying drawings, where like reference numerals refer to like parts throughout the several views, and where:

FIG. 4B is a block diagram of an example survey question database.

DETAILED DESCRIPTION

Figure 1:
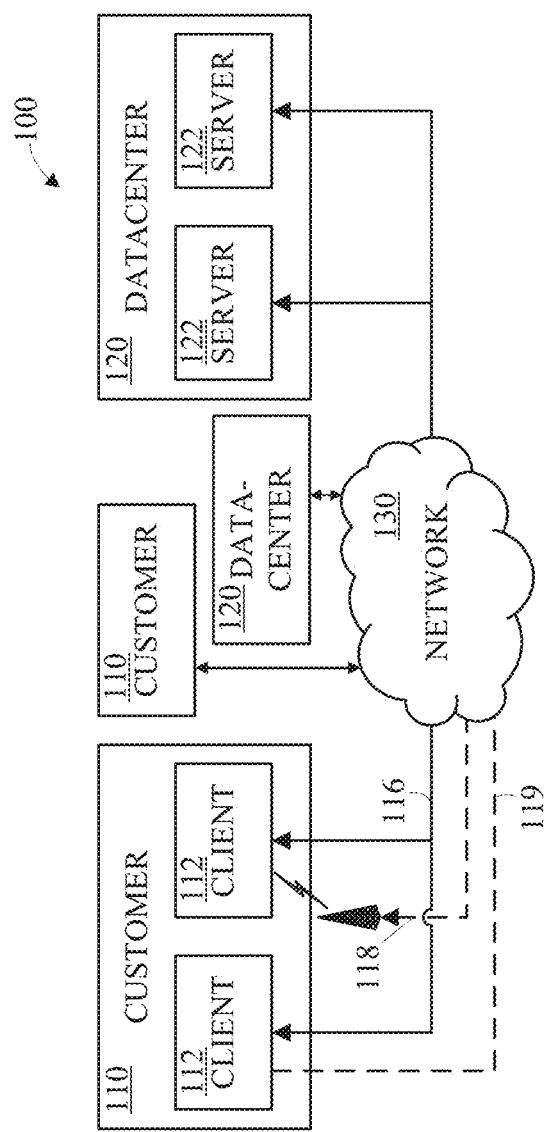
FIG. 1 is a block diagram of a networked distributed or cloud computing system in which the teachings herein may be implemented.

Different networks incidents have different levels of criticality. For some organizations, the most important incidents can include hacking, possible legal issues, or anything that might be subject to publication in the media. The response to such incidents should trigger some post incident analysis, by which the handling of the investigation, containment, eradication, and recovery of the incident is reviewed, and possible improvements to process and tools are considered. The nature of the incident can vary across occurrences too, which can affect the response. A post incident analysis can be most valuable if it contains significant and accurate detail, and if it is easy to use. For instance, an example post incident analysis might provide a report containing a detailed timeline, a listing of all personnel who were involved with the incident, all resulting changes, all needed updates to processes, action plans, meetings, etc.

However, security teams in an organization often lack their own incident handling. Generating a post incident report is fraught with difficulties. First, the required information can be difficult to find. Second, it can require a great deal of work to assemble all needed information from a multitude of heterogeneous sources. The information relevant to post incident review occurs in multiple records and/or data, sources, and may even require speaking with every person who worked on the security incident, which in many cases is simply impractical to perform in an automated fashion. Obtaining the information, as well as formatting it into a reasonable report can be time consuming, tedious, and error prone.

The present disclosure provides a post incident analysis tool that reduces the above referenced challenges. This can include the generation of a highly customized post-incident survey. Questions to include in the post incident survey are identified by applying an application criteria statement associated with each potential question in a survey question database to attributes of a network incident. As explained below, some or all of the identified questions are ultimately included in a survey that is transmitted to designated survey participants. Thus, the post incident survey is highly customized, and carefully tailored to the nature and criticality of the network incident. Some benefits of this include reduced time and improved efficiency and accuracy, because participants are only asked questions they need to answer.

Another benefit, in one implementation, is that selected ones of the identified survey questions are automatically pre-completed. This involves, for each of the selected questions, executing auto populating instructions associated with the selected identified survey question in the survey question database, and consequently identifying and retrieving answers to the selected identified survey question from predefined data sources specified in the auto populate instructions. This action even further customizes the resultant post incident survey, increasing its accuracy and efficiency, since some of the answers are pre-completed by machine. Moreover, according to an implementation, some or all of the pre-completed answers may be automatically omitted or hidden from the survey participants, or presented with a streamlined option for participants to accept or reject the proposed answer, further expediting the overall process.

With or without the benefit of the highly efficient post incident review, the system may optionally proceed to generate a post incident report. The report may include, for example, retrieved data describing causes and conditions relating to the subject network incident, pre-completed survey answers, received answers to the post incident survey, and more. The post incident report presents a thorough and uniquely valuable report addressing the analysis, containment, eradication, and recovery measures performed in conjunction with the network incident. In an implementation, the report may include some or all of a timeline of all actions, the preceding incident, events and external inputs detecting the incident, problems and changes created to address the causes of this incident, the names of all who worked on the incident, a summary of the cause and resolution, all tasks created and completed, calls and texts sent, etc. The report assembles all known information about the incident, with the optional results from the post incident review survey, into an organized report.

To describe some implementations in greater detail, reference is made to some example hardware structures and interconnections.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients. Customers and clients may be described more generally as respective user entities/groups and end users.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Cloud computing may provide various advantages over traditional computing models, including the ability to allocate shared resources amongst many different customers. Under traditional computing models, computing resources are typically allocated to a single customer or entity and substantial portions of those resources may remain unused or underused.

Computing resources of cloud computing infrastructure may be allocated, for example, using a multi-tenant or a single-tenant architecture. Under a multi-tenant architecture, installations or instantiations of application, database, and/or other software application servers may be shared among multiple customers. For example, a single web server (such as a unitary Apache installation), application server (such as a unitary Java Virtual Machine) and/or a single database server catalog (such as a unitary MySQL catalog) may handle requests from multiple customers. In a multi-tenant architecture, data or applications used by various customers may be commingled or shared. In an implementation of this architecture, the application and/or database server software may distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an example implementation, a customer instance is composed of multiple web server instances, multiple application server instances, and multiple database server instances. Each of these server instances may be located on different physical servers and each of these server instances may share resources of the different physical servers with a number of other server instances associated with other customer instances. In a given cloud infrastructure system, different implementations of customer instances may be used for different customer instances at the same time. Other configurations and implementations of customer instances may also be used. The web, application, and database servers of the customer instance may be allocated to different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server may replicate data to the secondary database server. The cloud computing infrastructure may be configured to direct traffic to the primary pair of web servers which may be configured to utilize the primary pair of application servers and primary database server respectively. In a failure scenario, the secondary servers may be converted to primary servers.

The application servers may include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances may be configured with a database configuration and schema to facilitate the operation of the platform. For example, the database server instance may be configured with various tables for storing metadata about applications, tables/fields, menus, forms, business rules, scripts, and custom user interface elements that are used to customize the appearance and operation of the customer instance. In some implementations, the application servers may include web server functionality and the web servers may be omitted.

Figure 2:
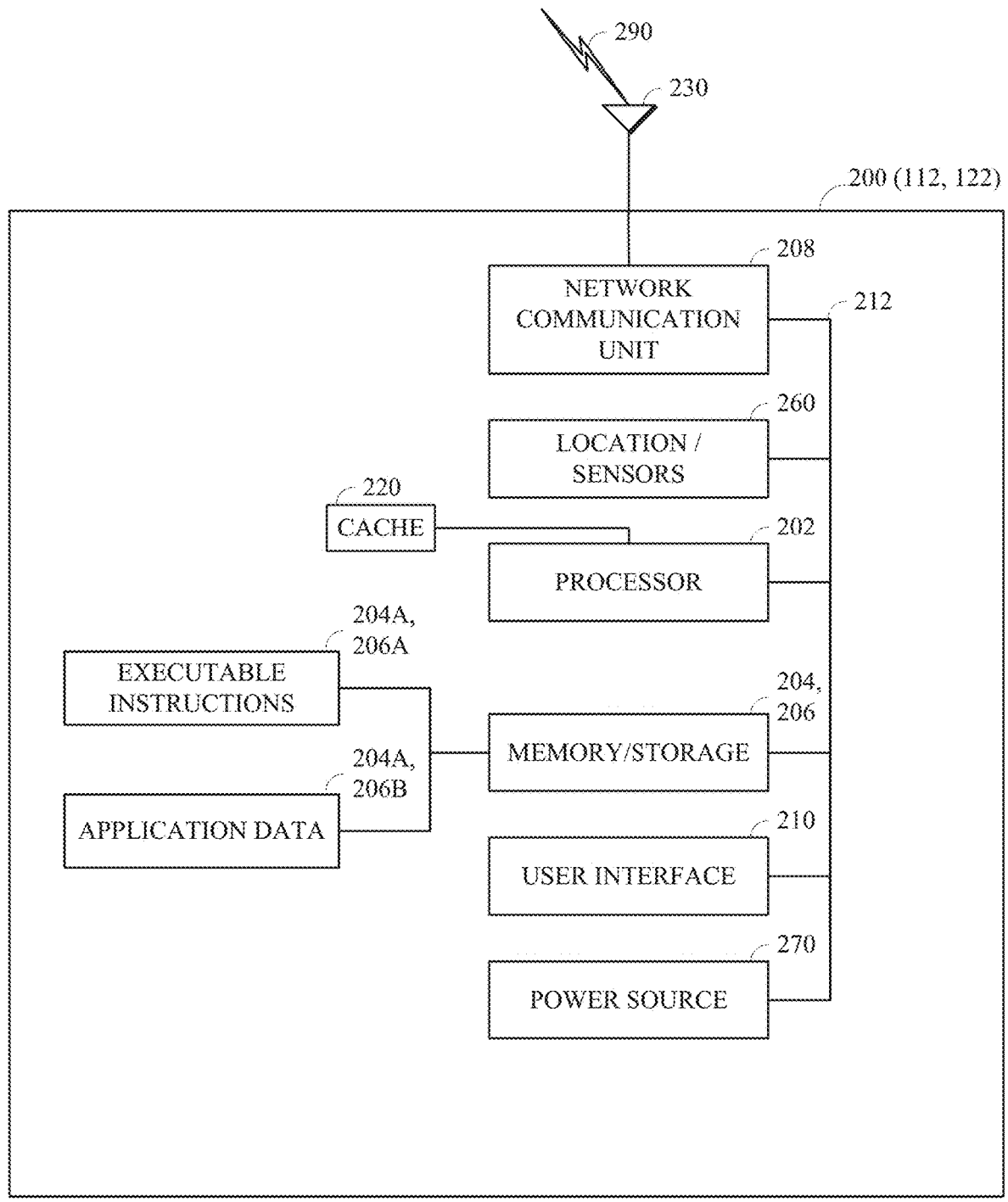
FIG. 2 is a block diagram of an example internal configuration of a computing device, such as a computing device of the computing system as shown in FIG. 1.

FIG. 2 is a block diagram of an example internal configuration of a computing device 200, such as a client 112 or server device 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein.

The term module, as used herein, can be implemented using hardware, software, or a combination thereof. A module may form a part of a larger entity, and may itself be broken into sub-entities. When a module is implemented using software, this software can be implemented as algorithmic components comprising program instructions stored in a memory, the instructions designed to be executed on a processor. The term "module" does not require any specific form of coding structure, and functional implementations of different modules may be independent but also may overlap and be performed by common program instructions. For example, a first module and a second module may be implemented using a common set of program instructions without distinct boundaries between the respective and/or common instructions that implement the first and second modules.

The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. A graphical user interface (GUI) 210 is specifically a user interface that allows people to interact with a device in a graphical. It can be broken down into an input portion, an output portion, and a processor that manages, process, and interacts with the input and output portions. The input portion can accept input created by elements such as a mouse, touchpad, touchscreen, or the like. The output portion of a GUI can generate input displayable on some form of a display, such as a cathode-ray tube (CRT), liquid crystal display (LCD), and light emitting diode (LED) display, such as an organic light emitting diode (OLED) display. The display is generally formed of a grid of pixels, each of which can take on various illumination and optionally color values that are grouped together and arranged to form various higher-level entities (in pixel regions) on the display. These pixel regions can make up icons, windows, buttons, cursors, control elements, text, and other displayable entities. The display utilizes graphical device interface that typically comprises a graphics processor specifically designed to interact with the hardware of the display, and may accept high-level instructions from other processors to reduce demands on them. The graphical device interface typically has its own memory that serves as a buffer and also allows manipulation of stored data by the graphics processor. Operation of the display thus typically involves the graphics processor accessing instructions and data stored memory to modify pixel regions on the display for the user.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
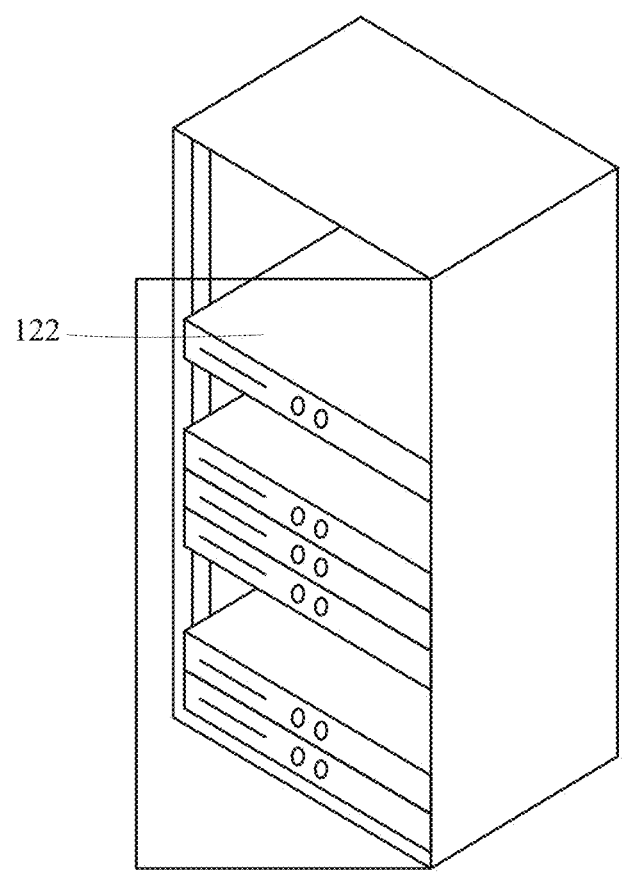
FIG. 3 is a perspective view of an example storage enclosure for housing computing equipment.

FIG. 3 is a perspective view of an example storage enclosure for housing computing equipment, such as the servers 122. One implementation of this structure includes a computer hardware rack or other storage enclosure, frame, or mounting that houses rack mounted servers. In this example, the computer servers include their own power supplies and network connections. Another implementation includes a blade enclosure containing blade servers. The blade enclosure includes power supplies, cooling units, and networking components shared by the constituent blade servers. A control center (not shown) may be provided to supervise and collectively manage operations of the racked computer servers.

Figure 4A:
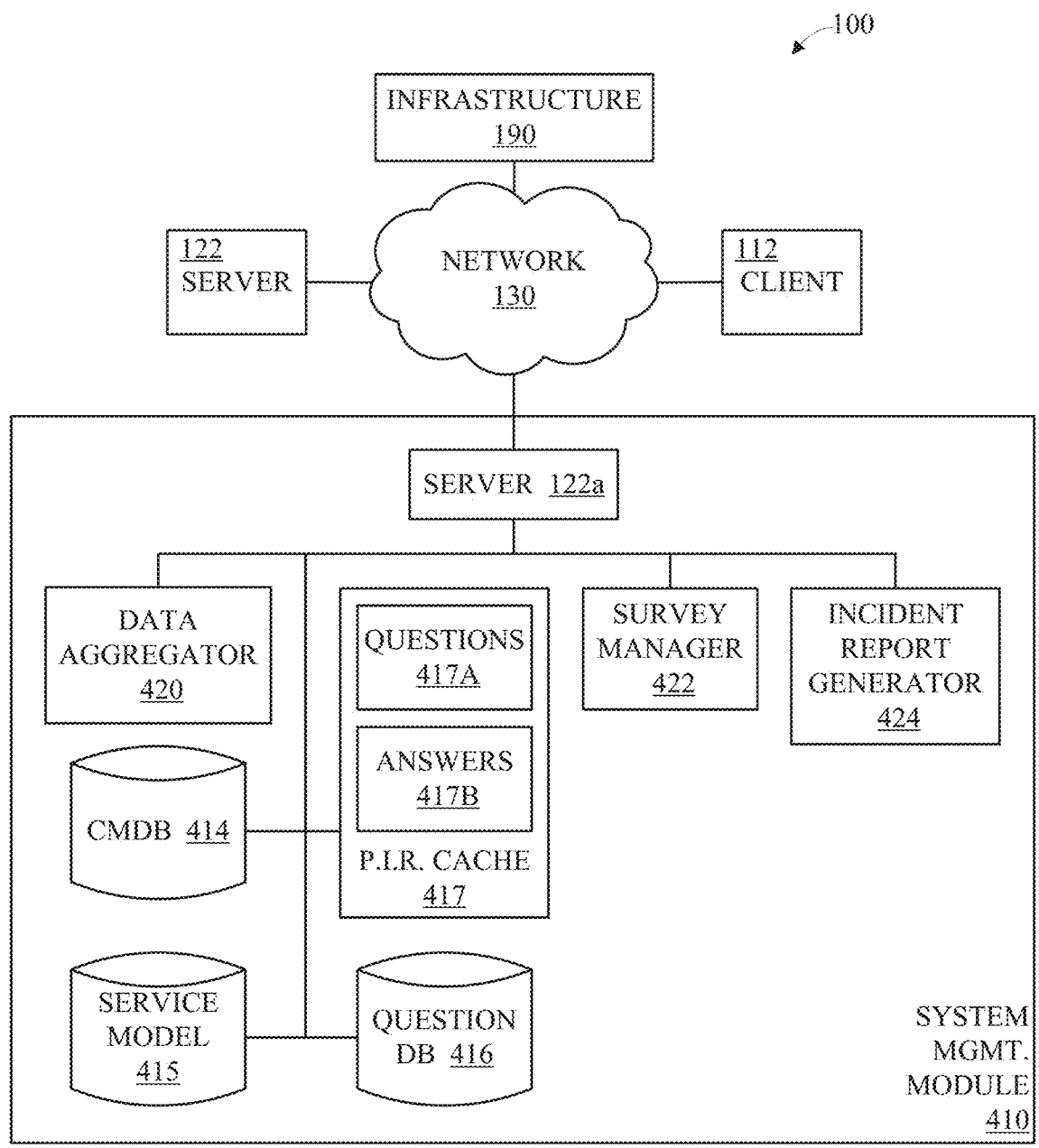
FIG. 4A is a block diagram of an example communications system.

FIG. 4A is a block diagram of an example cloud computing communications system 100. The system 100 includes various computer resources including, as exemplified, client 112 and server 122 computers interconnected to each other via the network 130. The system 100 may also include various items of infrastructure 190 coupled to the network 130. The infrastructure 190 may include multiple items of interrelated or unrelated computers, hardware, and/or software components representing or related to one or more physical structures such as buildings, building security systems, physical plants, utility distribution equipment, appliances, heating or air conditioning equipment, plumbing, doors and windows and gates, antennae, manufacturing lines, solar arrays, and other similar facilities.

One example of the network 130 is the public Internet, and other examples include one or multiple local area networks, wide area networks, Intranets, Extranets, Internetworks, Wi-Fi networks, or any other suitable technology using wires, radiofrequency, microwave, satellite, cellular, optical, or other communications.

The system 100 includes at least one repository of digital data storage, exemplified by the servers 122 as well as storage 414-417 (204, 206) of a system management module 410. Examples of the hardware components and interconnections of the client 112 and server 122 computers, and data storage 414-417 are discussed in detail below. In one implementation, the computer servers 122 store and manage client data. Client data may be stored in a single site or location or device, or alternatively, distributed among different sites or locations or devices. Without any intended limitation, a single-client arrangement is used as an example throughout this disclosure.

The system 100 also includes a system management module 410. The module 410, which may be implemented as one or multiple machines, includes a server 122*a* programmed to receive data from client/user computers 112 and also transmit selected information for display and other consumption by client/user computers 112. One function of the server 122*a* is therefore to assemble, collect, convert, format, and otherwise prepare output from other components of the system management module 410 for transmission and optional display to various networked clients via the network 130. In a different implementation, the server 122*a* may be considered to be outside the system management module 410. One specific example of the server 122*a* is a web server.

In one implementation, resources in the network are represented by nodes in a configuration management database (CMDB) 414, and more particularly, configuration items (CIs) in the CMDB 414. Each CI includes one or more relationships with one or more other CIs. Some of these relationships may include a dependency relationship. The collection of CIs and relationships may be represented in or by a service model 415. Depending upon the implementation, the service model 415 may be, but need not be, one-in-the same as the CMDB 414. The CMDB 414 may be populated by client submissions including web service imports, direct database imports, spreadsheet file imports, and the like. The service model 415 can, for example, represent relationships between software entities in a network that provide a high-level business service, such as a database-driven website. For example, the high-level business service could be a web service that is operated by a web server, which is a node. The web server can rely on a database server, for example, which is another node that is a dependency of the web server. The service model 415 can include multiple paths, such as for clusters, or can include a separate layer of connections to the physical hardware present in a network, such as servers, routers, switches, and the like.

CMDB or service model population may also occur via automated discovery and other methods conducted by the module 410. For example, with auto discovery, a discovery tool (not shown) of the module 410 identifies CIs and launches additional probes and sensors to gather further information and attributes about an identified CI and/or other CIs. In one implementation, auto discovery can be performed in a top-down fashion. When discovery is performed top-down, an entry point is first specified indicating how a business service is consumed (e.g., via a web service). The entry point is analyzed to identify one or more CIs (e.g., entities or nodes in the network) to which various probes can be sent to obtain additional information. These probes can be configured to identify other CIs related to the initially discovered CIs and associated relationships between the CIs. This process can be performed iteratively until no more CIs or relationships are discovered. The discovery tool may further check such data for errors, normalize and transform the data, and load the data to ensure the most recent and accurate profile of that CI.

The system management module 410 may also include client interface tools (not shown) that are operable with the server 122*a* to provide graphical views of complex information technology (IT) infrastructure and service relationships to client computers on the system 100. These client interface tools provide output by which IT professionals can click through data maps, filter data, focus in on specific CIs, and view impact and risk alongside in-flight operational activities such as incident, problem, and change requests. The client interface tools can further provide a simple and flexible reporting engine, which provides an output including dashboards and reports, which may be scheduled to be distributed on a regular basis. The client interface tools can provide administrators, system owners, and service owners with data to identify configuration drift, unplanned changes, and incident history to understand the health of CIs they are responsible for and the operational activities directly or indirectly impacting those CIs.

In an implementation, this data is used to populate information about other affected CIs and business services, based on the CI with the problem, and that information may be placed into the security incident, and from there into the security incident report, and may further be used to prepopulate or answer questions from the post incident review survey.

The system management module 410 also includes a number of components specific to the process (described below) of conducting post incident analysis. One of these components is a data aggregator 420, which collects, assembles, organizes, and stores incident related data from a diverse array of storage locations in the system 100. A survey manager 422 functions to generate, auto populate, and distribute post incident surveys. The survey manager 422 may also act to receive, assemble, organize, and store surveys that have been completed by survey participants. With the benefit of data from the data aggregator 420 and survey manager 422, an incident report generator 424 performs the task of assembling, formatting, and otherwise preparing a post incident report.

The data aggregator module 420 includes digital data storage 416 embodied by a survey question database. Referring to FIG. 4B, which is a block diagram of an example survey question database, the survey question database 416 includes multiple survey questions such as 416.1A-416.nA (collectively, or an example individual 416A). Broadly, the questions in this database are available for use by the survey manager 422 in preparing post incident surveys. An example question is, "What configuration instances were affected by the network incident?" Another example question might be, "Which business services were affected by the network incident?" Still another example is, "What problems were encountered and how did this change the outcome?" In one implementation, the predefined survey questions stored at 416 may include questions published by one or more prescribed technical standards bodies such as NIST.

Each question 416A is associated with its own application criteria statement and instance of auto populate instructions. Some of the statements and/or instructions may be duplicated or shared among questions. As an example, question 416.1A is associated with application criteria statement 416.1B and auto populates instructions 416.1C, and so on. These may, for example, be associated by being in the same row of a table (as illustrated), or by indexing, pointers. In this regard, the database 416 may be configured as a relational database, one or multiple table, array, list of comma separated values, linked list, or any other data construct.

Each application criteria statement can include a statement of conditions that the survey manager 422 applies (as discussed below) to the current network incident to determine whether that question should be included in the resultant post incident survey. More technically stated, the survey manager 422 may apply each statement to one or more targets such as the incident ID, service ticket related to the incident, incident type (explained in detail below), incident criticality, incident statement or summary or other details, conditions surrounding the incident, or other incident related data. As an example, some questions may be particular to the type of incident, such as, whether there is a police report available in the case of an incident involving criminal behavior. This helps avoid unrelated questions, such as questions about malware and viruses in relation to an incident regarding a physical attempt to break into a building in one example.

Each statement may comprise, for example, a query or filter, e.g., stated in Boolean logic. For example, an application criteria statement may specify that the related survey question should be included in a post incident survey if: (1) the attack vector=email, (2) the assigned person=Tim, (3) the business unit affected=ABC Corp., and (4) the type of incident=denial of service. This may be implemented in SQL, JavaScript, Xpath, or another appropriate language.

In one implementation, the system management module 410 may be further programmed to receive and carry out client input to add, change, remove, reorder, or otherwise modify any of the questions, application criteria statements, and/or auto populate instructions. This provides significant flexibility and customization for clients that operate the system management module 410.

Another component of the system management module 410 is an optional post incident review cache 417, which contains a question cache 417A and an answer cache 417B. While a post incident survey is being generated, the question cache 417A is used to collect questions selected for the post incident survey. The answer cache 417B is used for storing and assembling participants' answers to the questions of issued surveys. The cache 417 and its components may be physical, logical, virtual, or conceptual constructs merely used for explanatory purposes.

In contrast to the illustrated implementation, one or more items, records, components, database, or other units of digital data storage such as 414-417 may be stored apart from the system management module 410.

Various instances of digital data storage may be used to provide storage internal and/or external to the components previously described and illustrated. Depending upon its application, such digital data storage may be used for various functions, such as storing data and/or storing machine-readable instructions. These instructions may themselves support various processing functions, or they may serve to install a software program upon a computer, where such software program is thereafter executable to perform other processing functions related to this disclosure.

Figure 5A:
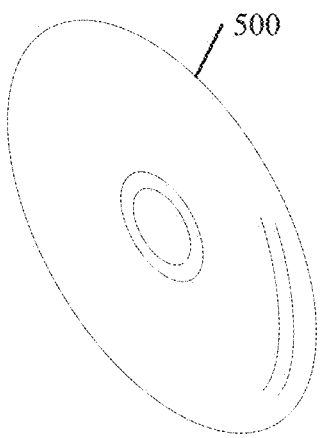
FIG. 5A is a perspective view of an example storage medium.

In any case, the storage media may be implemented by nearly any mechanism to digitally store machine-readable signals. FIG. 5A is a perspective view of an example storage medium 500 (204, 206), such as CD-ROM, WORM, or DVD. However, the storage medium can also include digital optical tape, disk storage, or other forms of storage. Another example of storage 500 is direct access storage, such as a conventional "hard drive", redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

An example storage medium 500 (204, 206) is coupled to a processor so the processor may read information from, and write information to, the storage medium. In the alternative, the storage medium may be integral to the processor. In another example, the processor and the storage medium may reside in an ASIC or other integrated circuit.

Figure 5B:
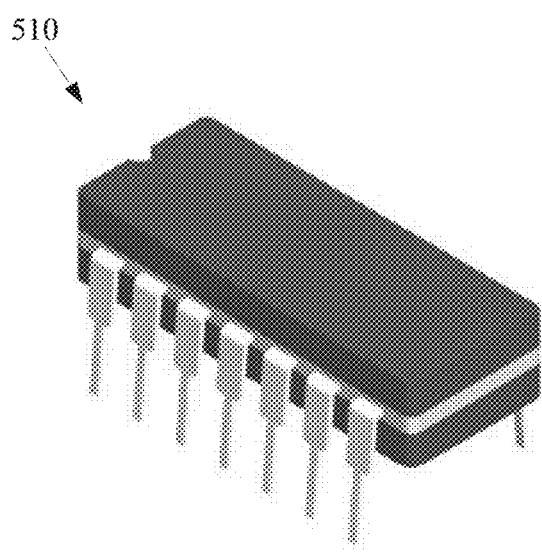
FIGS. 5B & 5C are perspective views showing examples of logic circuitry.
Figure 5C:
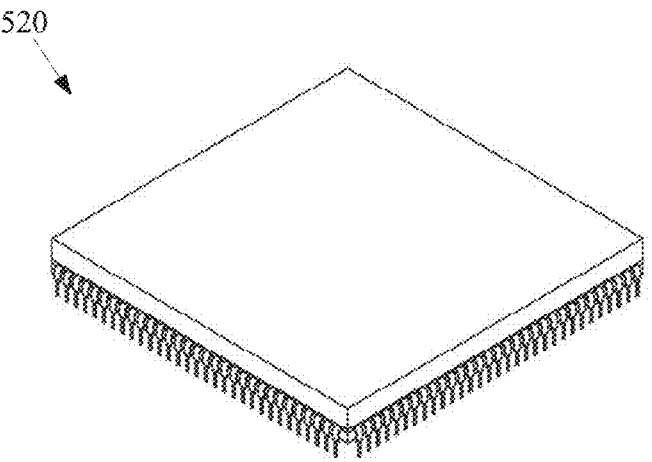

In contrast to storage media that contain machine-executable instructions, as described above, a different implementation uses logic circuitry to implement some or all of the processing features described herein. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like. FIG. 5B is a perspective view showing an example of logic circuitry at 510. FIG. 5C is a perspective view showing a different example of logic circuitry at 520.

Similarly, one or more clients or servers or other machines described herein may include an ASIC or programmable logic array such as a FPGA configured as a special-purpose processor to perform one or more of the operations or operations described or claimed herein. An example FPGA may include a collection of logic blocks and RAM blocks that may be individually configured and/or configurably interconnected in order to cause the FPGA to perform certain functions. Certain FPGAs may contain other general or special purpose blocks as well. An example FPGA may be programmed based on a hardware definition language (HDL) design, such as VHSIC Hardware Description Language or Verilog.

Having described the structural features of the present disclosure, some operational implementations of the disclosure will now be described. The operations of any method, process, or algorithm described in connection with the implementations disclosed herein may be embodied directly in hardware, firmware, software executed by hardware, circuitry, or a combination of these.

Figure 6:
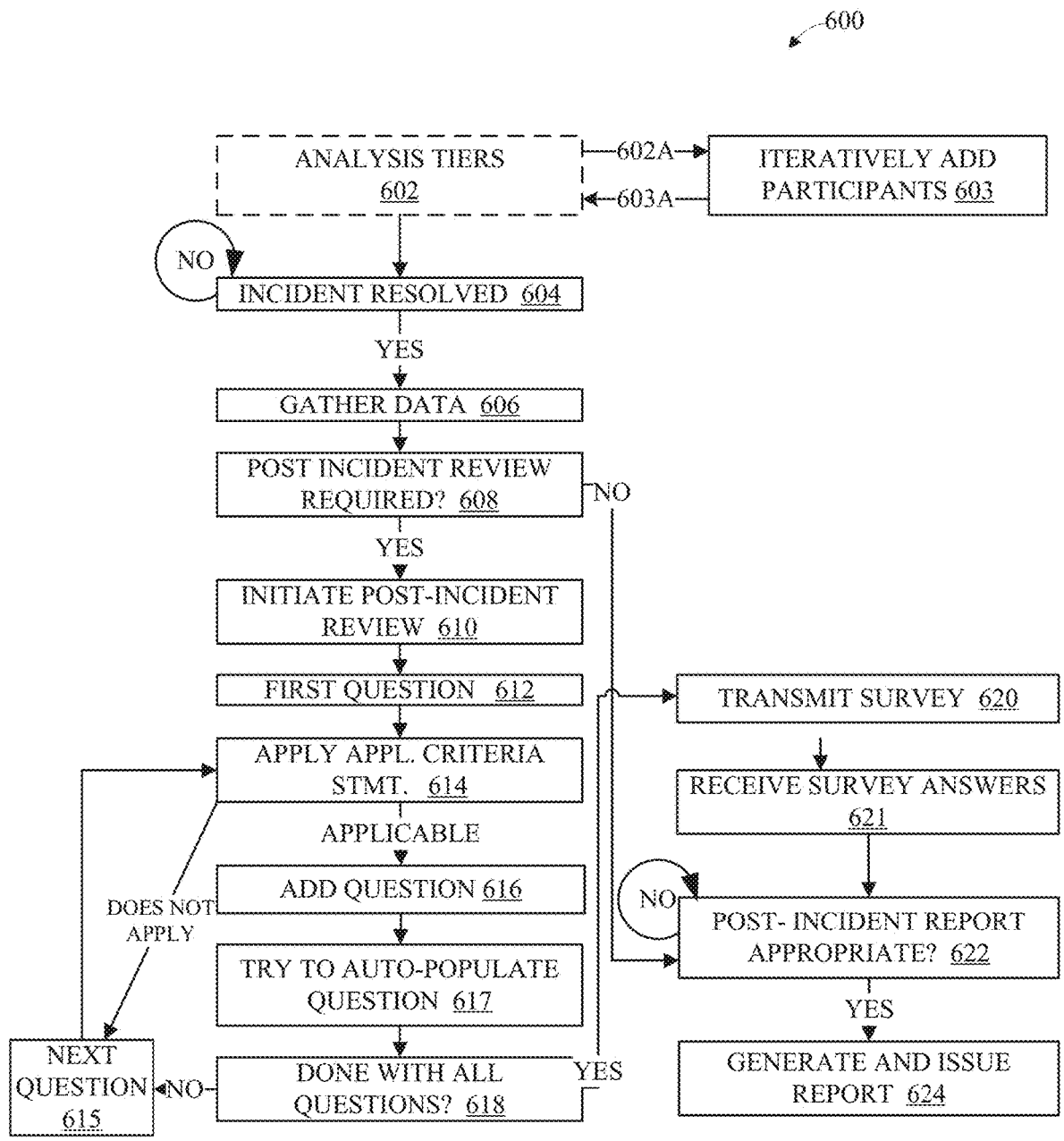
FIG. 6 is a flowchart showing an example post incident analysis process.

FIG. 6 is a flowchart of an example computer-implemented process. Broadly, the process 600 is used to conduct a machine-driven post incident analysis in a communications network. In one implementation, the process 600 may be executed using machines and hardware such as the equipment discussed above. In a more particular example, the process 600 may be performed by the system management module 410. In one implementation, the module 410 performs the process 600 by executing a machine-readable program of JavaScript, C, or other such instructions.

For ease of explanation, the process 600 is described and illustrated as a series of operations. However, operations in accordance with this disclosure may occur in various orders and/or concurrently. Additionally, operations in accordance with this disclosure may occur with other operations not presented and described herein. Furthermore, not all illustrated operations may be required to implement a method in accordance with the disclosed subject matter.

According to one implementation, some or all of the process 600 is integrated into a platform with other, unrelated, system-wide network management functions performed by the system management module 410. In this regard, the process operations 600 may be privy to human, yet system-logged, efforts to analyze, contain, eradicate, and recover from a subject network incident using this platform. In this context, a network incident relates to a security or other incident occurring or related to the equipment, services, or operation of the components in the system 100. This includes the servers 122 and client computers 112 as well as the network 130 and infrastructure 190, or even the system management module 410 itself. Incidents may relate, for example, to occurrences such as one or more criminal acts, security breaches, viruses, hardware component failures, communications failures, service level violations, strictly software related occurrences, strictly human based occurrences, strictly infrastructure related occurrences, denial of service events, or a combination of these or other occurrences.

Operation 602 illustrates the use of the platform by system administrators, engineers, IT managers, and other personnel to analyze, contain, eradicate, and recover from the network incident using this platform. This may involve various tiers of work, which escalate and expand depending on the nature and criticality of the network incident. Each time a person is assigned to a task, stage, or other implementation of this work, this triggers operation 603 (via 602A), which functions to appropriately add the person's name to a list of designated survey participants and then return (via 603A) to the analysis work 602. In an implementation, survey participants may also be added and removed manually upon demand at any point in the process.

When the system management module 410 receives a machine-readable command or alert concerning a network incident occurring in the system 100, this triggers operation 604. Such a command comprises a machine-readable instruction to commence post incident analysis, and may be initiated in response to an event or condition, human input, schedule, calendar, or other occurrence. Such an alert comprises a machine-readable notification of the occurrence of an incident, such as a network incident. In a specific example, the event of operation 604 comprises the network incident receiving notification that the incident has achieved a "resolved" status. In an implementation, the resolved status of a network incident is established by human input responsive to a decision that the incident is complete, the underlying problem has been contained and eradicated, and that operation of the related systems has been restored.

In the present example, this occurs by way of a system administrator or other responsible person completing a network accessible HTML form or other graphical user interface to initiate the process 600. As an example, the server 122a may generate and present the form on demand to one or more of the client machines such as 112.

Figure 7:
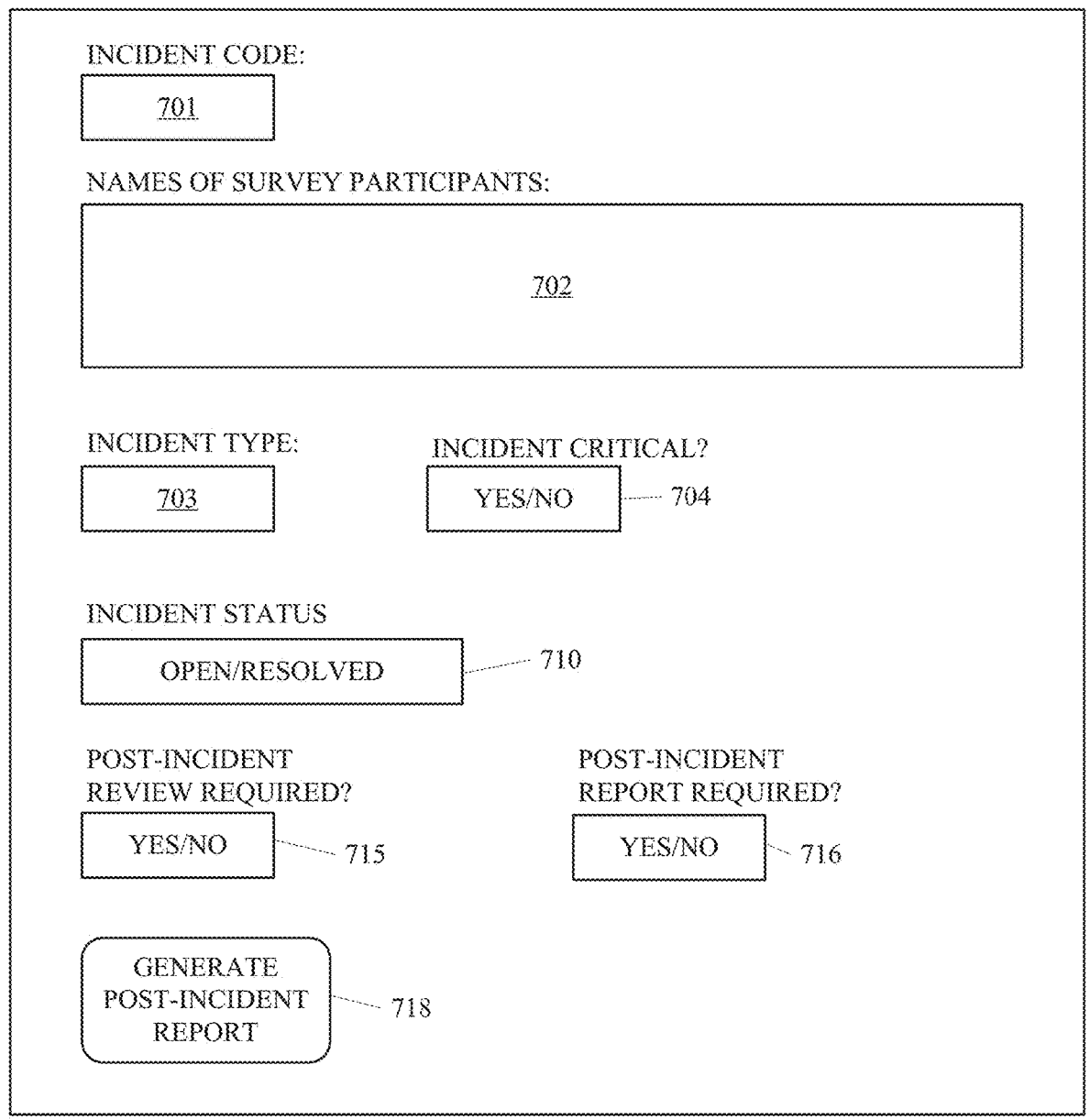
FIG. 7 is an excerpt of an example screen display.

FIG. 7 is an excerpt of an example screen display that shows an example of this network accessible HTML form 700 or related graphical user interface. The form 700 includes a field 701 for the system administrator or other appropriate user to enter an ID code for a subject incident. Some examples of the field 701 include at least one empty box, pull-down menu, pop-up window, hyperlink, or other input mechanisms.

A field 702 receives the names of the people assigned to resolve, investigate, or otherwise process the subject incident, for conveyance to the system management module 410. Some examples of the field 702 include at least one empty box, pull-down menu, pop-up window, hyperlink, or other input means. In accordance with the description mentioned above, the field 702 may be auto-populated as per operation 603.

By this field 702, survey participants are assigned or otherwise specified by an administrator, manager, or other responsible person completing the form 700. In a different example, the module 410 may directly or indirectly, actively or passively, receive a message from the administrator or retrieve a record of survey participant assignment stored by the administrator. In one example, various survey participants may be automatically pre-associated with different incident types, as specified in records stored by or accessible to the module 410. For sample, security officer James may be permanently associated with all incidents involving criminal behavior. Some survey participants may be associated with every incident type, as an example. For example, CEO Marjorie may be automatically associated with every incident regardless of type. In any case, the server 122a forwards identification of survey participants from the field 702 of the submitted form 700 to the survey manager 422.

Each incident is given at least one or more of multiple network incident types recognized by the system management module 410. Relatedly, a field 703 receives user designation of a type for the subject incident. Some example incident types include: criminal act, security breach, virus, hardware component failure, communications failure, service level violation, strictly software related, strictly human based, strictly infrastructure related, denial of service, and more. The field 703 may be implemented, as an example, by at least one empty box, pull-down menu, pop-up window, hyperlink, or other input mechanisms.

A field 704 receives a user specification as to whether the subject incident is designated as critical. Some examples of the field 704 include a radio button, check box, at least one empty box, pull-down menu, pop-up window, hyperlink, or other input means. In a different example, the server 122a may automatically omit, hide, or fill-out the field 704 if system management module 410 recognizes the incident type from field 703 as being critical.

A field 710 receives user input specifying the status of the subject network incident. In the illustrated example, this status includes open or resolved. In one example, setting the field 710 to "resolved" triggers the performance of operation 604, which as discussed below, commences post incident analysis.

A field 715 receives user input specifying whether a post incident review is required. Some examples of the field 715 include a radio button, check box, at least one empty box, pull-down menu, pop-up window, hyperlink, or other input mechanisms. In one implementation, when the work of operation 602 processes to a given level of escalation, this may automatically set field 715 to "YES."

Field 716 receives user input specifying whether a post incident report is required. Some examples of the field 716 include a radio button, check box, at least one empty box, pull-down menu, pop-up window, hyperlink, or other input means. In one implementation, if the security incident is set to critical in field 704, then one or both of fields 715, 716 are automatically set to "YES." In one implementation, when the work of operation 602 processes to a given level of escalation, this may automatically set field 716 to "YES." Fields 715, 716 may also, or instead, be filled manually. In a different example, the field 716 may be omitted entirely.

The form 700 also includes a button 718 or other graphical user interface feature. User selection of the button 718 signals to the server 122a the user's instructions to commence preparation of the post incident review and/or post incident report, as requested and specified in the form 700. Some examples of the feature 718 include hyperlinked text, a hyperlink button, etc.

Returning to FIG. 6, and as mentioned above, when the incident status is set to "resolved" in field 710, this satisfies operation 604. In other words, operation 604 advances to operation 606 when the system management module 122a receives machine-readable notification that the subject incident has been assigned a resolved status. Assignment of resolved status may, as mentioned above, be caused by human input. The notification may arrive in the form of a machine-readable message or command from a system administrator or other responsible person, or the system management module 410 may detect, search, monitor, retrieve, or otherwise actively or passively determine from stored records or otherwise that the subject incident has been resolved and now requires review. Resolved status means the subject incident is no longer ongoing or dynamic, so post incident review (if found to be appropriate in operation 608) and reporting may commence.

In operation 604, the server 122a conveys information such as the following to the system management module 410: instructions to commence a post incident analysis, identification of the incident, identification of the required or desired participants gathered in operation 603, whether a post incident review and report are required according to fields 715, 716, and other details as explained above in conjunction with FIG. 7.

After operation 604, the process 600 continues in operation 606. In operation 606, the data aggregator 120 gathers, receives, collects, compiles, assembles, or otherwise obtains prescribed types of machine-readable data describing causes and conditions relating to the subject network incident identified in operation 604. This data may come from various sources, such as system logs, records, databases, the CMDB 414, and other repositories of system data. Data that is the subject of operation 606 may concern, for example: (1) identification of an event, occurrence, or condition that caused the incident, (2) human generated decisions to change, improve, or update the network or related infrastructure, (3) human decisions to track problems found during the investigation of the subject incident, and (4) any other data related to the incident.

In operation 608, the system management module 410 determines whether a post incident review is required. In one example, this is determined by the completion of field 715 of FIG. 7. Alternatively, this may be automatically determined based upon the type of the subject incident from field 703. In another example, post incident review may be mandated by the level of progress or escalation of incident investigation conducted in operation 602 as discussed above. As another alternative, the act of determining whether a post incident review is required may be carried out by the system management module 410 receiving a notification in the form of a machine-readable message or command from a system administrator or other responsible person, or the system management module 410 may detect, search, monitor, retrieve, or otherwise actively or passively recognize when such a "post incident review required" status is stored in an appropriate record or otherwise set or established.

If a post incident review is not required, then operation 608 jumps to operation 622 (described below), skipping over operations 610-621 (also described below). In this event, the system management module 410 will generate the post incident report (in operation 624, discussed below) free of information from any post incident survey.

If a post incident review is mandated, however, then operation 608 advances to operation 610 where the system management module 122 initiates a post incident review. In particular, in operation 610 the survey manager 422 begins the process of putting together a post incident survey. Broadly, this involves identifying survey questions to include in the post incident survey by applying the application criteria statement associated with each survey question in the survey question database 116 to attributes of the subject network incident. Thus, the survey questions are highly customized, according to the nature and criticality of the network incident. In an implementation, each question may be customized by using an application criteria statement that includes any of the data in the incident, not only criticality or category, but attack vector, person assigned to it, assignment group, even custom fields added by the client.

In operation 612, the survey manager 422 considers a first question, such as 416.1A, from the database 416. Operation 614 applies the application criteria statement 416.1B to the subject network incident. More technically stated, the survey manager 422 applies the statement 416.1B to one or more items of data associated with the network incident, such as the incident ID, service ticket related to the incident, incident type, incident criticality, incident statement or summary or other details, conditions surrounding the incident, or other incident related data. For example, an application criteria statement may specify that the related survey question should be included in a post incident survey if: (1) the attack vector=email, (2) the assigned person=Tim, (3) the business unit affected=ABC Corp., and (4) the type of incident=denial of service. The result of applying this logic to the network incident is a "YES" or "NO," indicating whether to include the question in the survey or not. If the answer is "NO," then operation 614 proceeds to consider the next question in the database 116 in operation 615. If the answer is "YES," then operation 616 adds the subject question to the question cache 417A.

In operation 617, the survey manager 422 attempts to auto populate the current question 416A. Namely, the survey manager 422 executes the auto populate instructions 416C. The instructions associated with the question 416A contain specific machine-readable instructions to gather explicitly stated data form explicitly stated data sources such as system logs, records, databases, the CMDB 414, incident ID, service ticket related to the incident, incident type, incident criticality, incident statement or summary or other details, conditions surrounding the incident, or other incident or system related data. The instructions may include sophisticated routines and result-dependent logic to pursue data from one source to further and further sources. The instructions 416C may, in one implementation, comprise a sequence of JavaScript that may be able to query the entire CMDB and any other available databases. The auto populate operation 617 may succeed, or in some cases, the information sought cannot be found.

In one example, pre-completion of the selected survey questions is carried out by pre-populating one or more fields of the post incident survey as published via a network accessible HTML interface. Without any intended limitation, some example survey answers that are subject to being prepopulated by scripts include: the list of affected CIs/servers, the list of business services affected, and the like. Some responses may even be replaced by the value of the script or field, such as the "who is in charge of this incident" question.

Next, in operation 618, the survey manager 422 asks whether all questions from the survey question database have been processed in accordance with operations 614-617. If not, operation 615 proceeds to the next question. When all questions have been processed, operation 620 is performed next. In operation 620, the survey manager 422 transmits the completed survey to the survey participants that were identified in operation 603. In one example, the operation of transmitting the post incident survey to the designated survey participants comprises the survey manager 422 and server 122a publishing the questions from cache 417A via a web interface and then transmitting a notification or other message indicating survey availability to each of the designated survey participants.

In one implementation, the survey manager 422 is programmed to omit or hide post incident survey questions from survey participants in the event the relevant answers have been populated by the prescribed script. In this implementation, the pre-completed survey answers need not be pre-populated into the survey, and instead they may be stored in 417B in association with the survey for later insertion into the post incident report in operation 624, discussed below. In a different example, where the survey contains auto-populated answers, the published survey may be configured to have users either confirm, edit, or reject the auto-populated answers. In a different example, the published survey may limit user participant to answering questions that were not, or could not be, auto populated. In one example, the auto-populated survey answers from operation 617 are stored in the cache 417B.

In operation 621, the survey manager 422 receives answers to the survey transmitted in operation 620. This may occur, for example, via the survey published via web interface as explained above. Here, the act of receiving answers to the post incident survey includes the survey manager 422 receiving separate completion of the post incident survey via the network accessible HTML interface by each different survey participant. In one implementation, received survey answers are stored in the answer cache 417B. Survey answers may arrive all-at-once, slowly over time, in batches, or any other form. In one example, the survey manager 422 allows for a prescribed time for each survey participant to answer the survey, after which point the survey is resolved and operation 621 proceeds to operation 622. In an implementation, survey participants may be added and removed by human or other input, even after operation 603. Also, in an implementation, the system management module 410 may permit survey participants to go back and update or change their answers.

Operation 622 determines whether it is appropriate to start preparing a post incident report. In one implementation, the operation of generating a post incident report (operation 624, below) is only performed if the incident report generator 424 has received a machine-readable notification, command, message, or other indication that the report is required. In one example, this is determined by the completion of field 716 of FIG. 7. In a different example, this notification may arrive in the form of a machine-readable message or instruction from a system administrator or other responsible person, or the system management module 410 may detect, search, monitor, retrieve, or otherwise recognize when the notification is stored in an appropriate record. In one example, the incident report generator 424 may be configured such that operation 622 will always generate a post incident report for incidents having been designated as critical as per field 704 of FIG. 7. In another example, the incident report generator 424 may proceed to operation 624 when a user activates the button or other interface feature 718, as described above.

In operation 624, and under the conditions described above, the incident report generator 424 generates a post incident report. This report includes information such as the following. First, the report includes some or all of the gathered data from operation 606, which describes causes and conditions relating to the network incident. The report may further include the selected survey questions that were pre-populated in operation 617 and stored in the answer cache 417B. The report may also include some or all of the answers to the transmitted post incident survey that were received in operation 621 and stored in the answer cache 417B. Having completed the post incident report, this report may serve various functions such as providing documentation as to how the incident was handled, supplying proof that timely and appropriate action was taken, and other purposes as well.

In one implementation, each survey answer is mapped to a predetermined section or heading of the post incident report according to an established formatting stored in the survey question database 417 or elsewhere. In an implementation, this established formatting may be created and/or edited by client input. Operation 624 may also include a facility or interface for a system administrator, client, or other user to edit the post incident report before it is finalized and distributed.

Table 1 below provides examples of post incident reports, which each contain a mix of information from: the security incident; the records that spawned the security incident; records created in response to the security incident such as problems, changes, other tasks; and surveys that were completed. Some example sections are described as follows. First, the start, header, or introduction of the report lists: a short description, a category, assignment data, attack vectors, priority, risk, location, etc. The Summary summarizes the whole process, capturing the initial description, as well as the notes indicating the cause and solution when the subject incident was resolved. The Timeline pulls data from a stored history of updates to the incident, as well as the originating record, if any, as well as any tasks created during the process of solving this problem. The Findings include all of the responses from the post incident review survey. In one example, findings may be omitted for each of the survey designees that opts not to complete the survey. The Resolution from the incident includes close code, lessons learned, if any, changes and problems created to deal with this incident, any known vulnerabilities that were found, information from all of these.

TABLE 1

POST INCIDENT REPORT EXAMPLE

SIR0010001 Post Incident Review
I just went to our XYZ site, and it was down.
Assigned to: Terrell Rodda
Priority: 3 - Moderate, Impact: 1 - High, Severity: 2 - Medium, Risk: Moderate
Category: Malicious code activity - Worm, virus, Trojan
Requested by Stephen Seiters, Location: 2-12-1 Ookayama, Meguro-ku, Tokyo
SUMMARY The XYZ portal appears to be down. This resembles the known attack in the vulnerability above.
The server templates used to construct the XYZ servers had the obsolete MyFirstAntivirus installed in them. A change request has been made to review and update all templates, and a problem will track the process of updating all existing servers.
INCIDENT TEAM Terrell Rodda - IT
Brant Darnel - Sales
Beth Anglin - Sales
System Administrator - System Administrator
Deepa Shah - Development
TIMELINE 2015-06-01 13:22:21 Stephen Seiters
INC0010002 created: 'I just went to our XYZ site, and it was down.'
2015-06-01 13:25:26 Beth Anglin
Priority: 3 - Moderate
Short description: I just went to our XYZ site, and it was down.
State: Analysis
2015-06-01 13:30:21 Brant Darnel
Assigned to: Brant Darnel
Description: The XYZ portal appears to be down. This resembles the known attack in the vulnerability above.
Work notes: I've identified the vulnerability that should be this. Creating tasks to patch servers.
2015-06-01 13:30:36 Brant Darnel
State: Contain
2015-06-01 13:35:19 Brant Darnel
SIT0010001
Description: Update the antivirus to the company standard WebAftec antivirus software, and ensure it removes the current virus.
Priority: 1 - Critical
Short description: Replace the MyFirstAntivirus software on all XYZ servers
State: Draft
2015-06-01 13:39:43 System Administrator
Work notes: This problem is not limited to the XYZ servers. Create a change to update our process and problems to remove obsolete antivirus software from all servers.
2015-06-01 13:40:02 System Administrator
State: Recover
2015-06-01 13:43:54 System Administrator
Work notes: WebMcTec antivirus software has been installed to all XYZ servers. The portal is back up and appears to function. Logs are being examined to see if any PII data was downloaded.
2015-06-01 13:44:08 System Administrator
Assigned to: Terrell Rodda
2015-06-01 13:44:57 Terrell Rodda

TABLE 1-continued

POST INCIDENT REPORT EXAMPLE

State: Eradicate
Work notes: Moving back to eradicate Virus is confirmed gone. Logs verify that no data
was downloaded.
2015-06-01 13:47:15 Terrell Rodda
SIT0010001
Assigned to: Deepa Shah
State: Work In Progress
2015-06-01 13:47:15 Terrell Rodda
State: Contain
Work notes: Moving back to containment Automatically set to Contain as some tasks
are Contain and all tasks are fully defined
2015-06-01 13:48:25 Deepa Shah
Work notes: Completed upgrading the antivirus on all XYZ servers. 3 had the
virus, including the portal. All have had the virus eradicated.
2015-06-01 13:49:57 Terrell Rodda
State: Review
2015-06-01 13:56:30 Brant Darnel
State: Closed
Work notes: All post incident reviews closed or cancelled, closing security incident
FINDINGS

. . .
DETECTION AND ANALYSIS

Did the incident cause damage before it was detected?
'No' 100.0% - Terrell Rodda, Brant Darnel
Were needed logs available, or should they be enabled?
'Yes' 50.0% - Terrell Rodda
'No' 50.0% - Brant Darnel
What additional logging should be enabled?
Brant Darnel: I couldn't find the access log - it looked disabled.
Was the cause identified?
'Yes' 100.0% - Brant Darnel, Terrell Rodda
Were other systems affected by the same attack?
'Yes' 50.0% - Terrell Rodda
'No' 50.0% - Brant Darnel
Did existing alerts and monitors detect this problem on all affected systems?
'N/A' 50.0% - Brant Darnel
'Yes' 50.0% - Terrell Rodda
What business services were affected?
Brant Darnel: XYZ Enterprise Services, XYZ Portals
Terrell Rodda: XYZ Enterprise Services, XYZ Portals
Who is in charge of this incident?
'Terrell Rodda'
CONTAINMENT AND ERADICATION What information did we acquire, preserve, secure, and document?
Terrell Rodda: Logs indicating origin of virus
How did we contain the incident?
Terrell Rodda: Disconnected affected servers, rolled over to a backup set of servers that
were not affected temporarily.
How did we eradicate the incident?
Terrell Rodda: Updated antivirus and verified all servers were clean
What vulnerabilities did we identify?
Terrell Rodda: Our server templates were not all set to use the most up to date antivirus.
Brant Darnel: Found vulnerability CVE-2015-0255, documented in incident
Were customers affected?
'No' 100.0% - Brant Darnel, Terrell Rodda
RECOVERY What additional monitoring or alerts did we implement?
Terrell Rodda: A change request was created to add verification and new processes
when creating and using server templates to be sure they are up to date on all software.
What tools were useful to analyze, contain, and eradicate this issue?
Terrell Rodda: WebMcTec, Quality, Splash, and Notepad
Were there any issues of coordination with other teams?
'N/A' 50.0% - Brant Darnel
'No' 50.0% - Terrell Rodda
What systems were affected?
Terrell Rodda: XYZ Portals, XYZ Financials, XYZ Supply Chain Management, XYZ
Asset Lifecycle Management, XYZ Governance, XYZ CRM, XYZ HRMS, XYZ
Portals, XYZ Enterprise Services, XYZ Reporting
Brant Darnel: XYZ Portals, XYZ Financials, XYZ Supply Chain Management, XYZ
Asset Lifecycle Management, XYZ Governance, XYZ CRM, XYZ HRMS, XYZ
Portals, XYZ Enterprise Services, XYZ Reporting, also George's personal server.
Were all systems able to be restored to an operationally ready state?
'N/A' 50.0% - Terrell Rodda
'Yes' 50.0% - Brant Darnel

TABLE 1-continued

POST INCIDENT REPORT EXAMPLE

POST INCIDENT ACTIVITY

Did we schedule a lessons learned meeting?
'N/A' 100.0% - Terrell Rodda, Brant Darnel
Is this a recurrence of a prior incident?
'N/A' 50.0% - Brant Darnel
'No' 50.0% - Terrell Rodda
What reports were created documenting the timeline and incident details?
Terrell Rodda: Post incident review to be generated
What were the monetary damages from this incident?
'N/A' 100.0% - Brant Darnel, Terrell Rodda
RESOLUTION Closure type: Solved (Permanently)
Vulnerability CVE-2015-0255
CWE Entry: Information Leak/Disclosure
Access vector: Network
X.Org Server (aka xserver and xorg-server) before 1.16.3 and 1.17.x before 1.17.1
allows remote attackers to obtain sensitive information from process memory or cause a
denial of service (crash) via a crafted string length value in a XkbSetGeometry request.
PRB0040001
State: Open
Assigned to: Luke Wilson
Priority: 4 - Low
Update antivirus from MyFirstAntivirus to the company standard
Ensure no viruses remain.
CHG0030001
State: Closed Complete
Priority: 1 - Critical
Many servers still have MyFirstAntivirus on them.
Update all templates used for all system servers to only use WebMctec antivirus.

Figure 8:
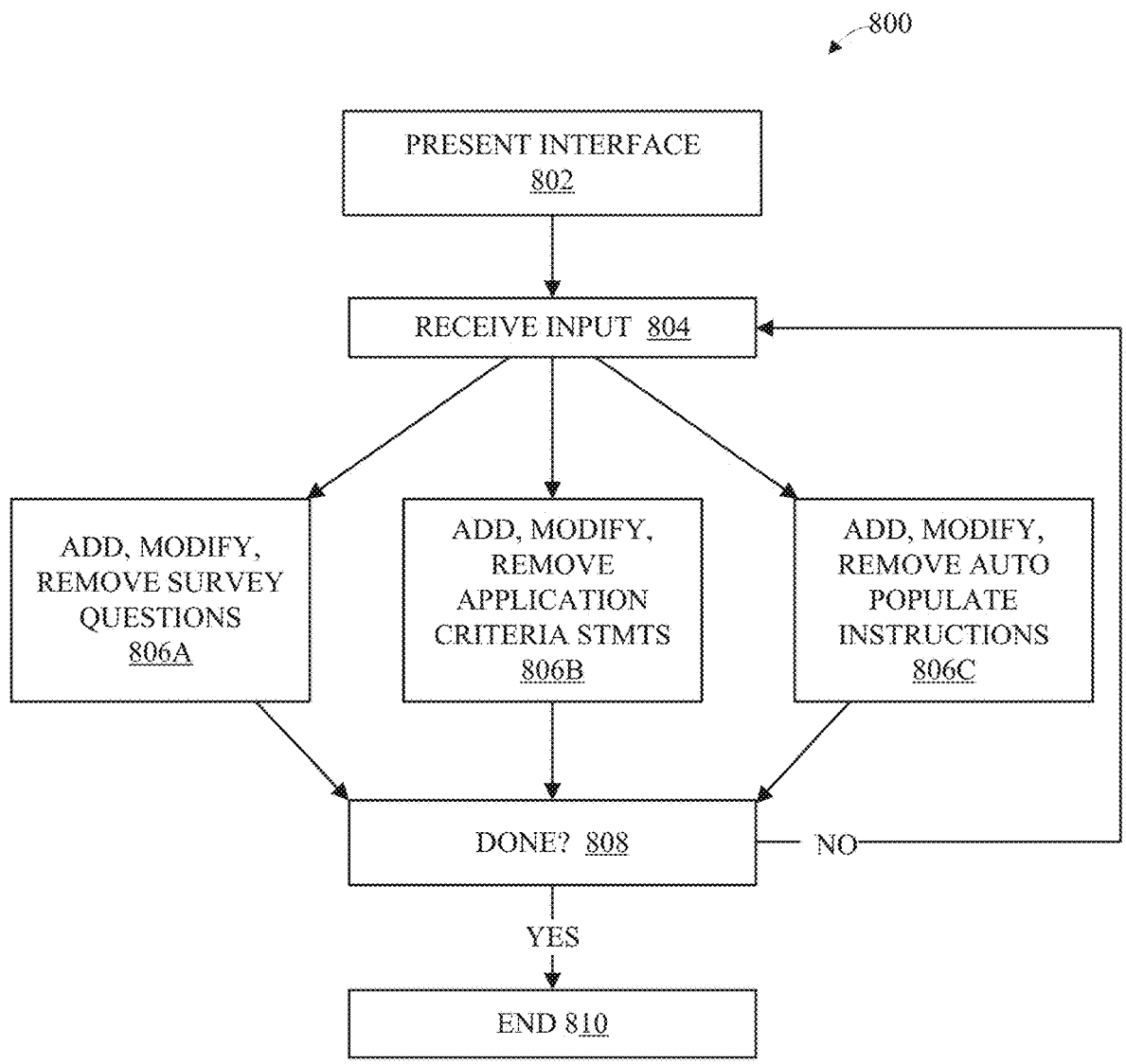
FIG. 8 is a flowchart showing an example process to receive and implement client changes to the survey question database.

Another implementation of the system 100 concerns a facility for clients to configure the survey question database 416. In one implementation, this is carried out according to the process 800 illustrated in FIG. 8, which is a flowchart showing an example process to receive and implement client changes to the survey question database. In operation 802, the server 122a presents, on demand, an optional web-based editing interface (not shown) to clients. In operation 804, the server 122a receives client input, and then in operations 806A-806C the server 122a carries out the addition, removal, or modification of survey questions, application criteria statements, and/or auto populate instructions according to the client instructions received in operation 804. In an implementation, operations 806A-806C or other operations responsive to client input in operation 804 may further serve to amend the mapping between survey answers and headings or sections in the post incident report. Operation 808 asks if the client is finished, and if not operation 804 and operations 806A-806C are repeated, otherwise the routine 800 ends in operation 810.

All or a portion of implementations of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

The implementations herein may be described in terms of functional block components and various processing operations. Such functional blocks may be realized by any number of hardware and/or software components that perform the specified functions. For example, the described implementations may employ various integrated circuit components, e.g., memory elements, processing elements, logic elements, look-up tables, and the like, which may carry out a variety of functions under the control of one or more microprocessors or other control devices. Similarly, where the elements of the described implementations are implemented using software programming or software elements the invention may be implemented with any programming or scripting language such as C, C++, Java, assembler, or the like, with the various algorithms being implemented with any combination of data structures, objects, processes, routines or other programming elements. Functional implementations may be implemented in algorithms that execute on one or more processors. Furthermore, the implementations of the invention could employ any number of conventional techniques for electronics configuration, signal processing and/or control, data processing and the like. The words "mechanism" and "element" are used broadly and are not limited to mechanical or physical embodiments or implementations, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the invention may be implemented using machine readable instructions in the form of code for operation of any or any combination of the aforementioned computational hardware. Computational code may be implemented in the form of one or more modules by which individual or combined functions can be performed as a computational tool, the input and output data of each module being passed to/from one or more further module during operation of the methods and systems described herein.

The word "example" is used herein to mean serving as an example, instance, or illustration. Any implementation or design described herein as "example" is not necessarily to be construed as preferred or advantageous over other implementations or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, implementation, or implementation unless described as such.

The particular implementations shown and described herein are illustrative examples of the invention and are not intended to otherwise limit the scope of the invention in any way. For the sake of brevity, conventional electronics, control systems, software development and other functional implementations of the systems (and components of the individual operating components of the systems) may not be described in detail. Furthermore, the connecting lines, or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or example language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described implementations have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system for post-incident analysis of an incident associated with one or more devices or one or more services of a communications network, comprising:
    a system management server, comprising:
        a processor; and
        a memory, accessible by the processor, the memory storing instructions, that when executed by the processor, cause the processor to perform operations comprising:
            receiving incident data associated with the incident and identification information associated with at least one survey participant; and
            after receiving the incident data, generating a post-incident survey based on the incident data, comprising:
                identifying a plurality of survey questions stored in a database to include in the post-incident survey, wherein identifying the plurality of survey questions comprises applying application criteria statements associated with respective survey questions of the plurality of survey questions to the incident data to determine whether the respective survey questions are relevant to the incident;
                automatically completing a first subset of the plurality of survey questions by executing auto-populate instructions associated with the respective survey questions of the first subset and retrieving respective answers to the respective survey questions of the first subset from predefined data sources specified in the auto-populate instructions;

storing the respective retrieved answers in association with the post-incident survey in an additional memory accessible by the system management server; and transmitting a second subset of the plurality of survey questions to one or more respective computing devices associated with at the least one survey participant based on the identification information.

2. The system of claim 1, where the operations comprise:

receiving respective answers associated with the respective survey questions of the second subset from the one or more respective computing devices; and generating a post-incident report comprising:
at least a portion of the incident data;
the respective retrieved answers to the first subset; and
at least a portion of the respective received answers to the second subset.

3. The system of claim 1, wherein the operations comprise generating the post-incident survey in response to receiving an alert indicating that the incident has been resolved.

4. The system of claim 1, wherein each application criteria statement of the application criteria statements comprises a query and target data and applying the application criteria statement to the incident data comprises executing the query against the incident data to determine whether the incident data includes the target data.

5. The system of claim 1, wherein the operations comprise transmitting the first subset of the plurality of survey questions with the second subset, and wherein the first subset of the plurality of survey questions is auto-populated with the respective retrieved answers before being transmitted.

6. The system of claim 1, wherein the operations comprise:

receiving one or more user inputs from a user computing device; and adding, modifying, or removing a particular survey question of the plurality of survey questions, a particular application criteria statement, or a particular auto-populate instruction in the database, or any combination thereof, based on the received one or more inputs.

7. The system of claim 1, wherein the application criteria statements associated with the respective survey questions define whether the respective survey questions are mandatory in the post-incident survey.

8. A non-transitory, computer-readable storage medium, comprising instructions that, when executed by a processor, cause the processor to:

receive incident data associated with an incident and identification information associated with at least one survey participant; and after receiving the incident data, generate a post-incident survey based on the incident data, comprising:
identifying a plurality of survey questions stored in a database to include in the post-incident survey, wherein identifying the plurality of survey questions comprises applying application criteria statements associated with respective survey questions of the plurality of survey questions to the incident data to determine whether the respective survey questions are relevant to the incident;
automatically completing a first subset of the plurality of survey questions by executing auto-populate instructions associated with the respective survey questions of the first subset and retrieving respective answers to the respective survey questions of the first subset from predefined data sources specified in the auto-populate instructions;
storing the respective retrieved answers in association with the post-incident survey in a memory accessible by a system management server; and
transmitting a second subset of the plurality of survey questions to one or more respective computing devices associated with at the least one survey participant based on the identification information.

9. The non-transitory, computer-readable storage medium of claim 8, wherein the instructions cause the processor to generate the post-incident survey in response to receiving an alert indicating that the incident has been resolved.

10. The non-transitory, computer-readable storage medium of claim 8, wherein the instructions cause the processor to:

receive respective answers associated with the respective survey questions of the second subset from the one or more respective computing devices; and generate a post-incident report comprising:
a timeline associated with a history of updates to the incident;
the respective retrieved answers to the first subset; and
at least a portion of the respective received answers to the second subset.

11. The non-transitory, computer-readable storage medium of claim 10, wherein the post-incident report comprises information associated with an analysis of the incident and resolution of the incident.

12. The non-transitory, computer-readable storage medium of claim 8, wherein the plurality of survey questions are identified based on a category of the incident or a criticality of the incident.

13. The non-transitory, computer-readable storage medium of claim 8, wherein the application criteria statements associated with the respective survey questions define whether the respective survey questions are mandatory in the post-incident survey.

14. The non-transitory, computer-readable storage medium of claim 8, wherein the instructions cause the processor to:

transmit the first subset of the plurality of survey questions with the second subset, wherein the first subset of the plurality of survey questions is auto-populated with the respective retrieved answers before being transmitted; and receive respective confirmation of the respective retrieved answers from the respective computing devices.

15. A method for post-incident analysis of an incident associated with one or more devices or one or more services of a communications network, comprising:

receiving incident data associated with the incident and identification information associated with at least one survey participant; and after receiving the incident data, generating a post-incident survey based on the incident data, comprising:
identifying a plurality of survey questions stored in a database to include in the post-incident survey, wherein identifying the plurality of survey questions comprises applying application criteria statements associated with respective survey questions of the plurality of survey questions to the incident data to determine whether the respective survey questions are relevant to the incident;

automatically completing a first subset of the plurality of survey questions by executing auto-populate instructions associated with the respective survey questions of the first subset and retrieving respective answers to the respective survey questions of the first subset from predefined data sources specified in the auto-populate instructions;

storing the respective retrieved answers in association with the post-incident survey in a memory accessible by a system management server; and transmitting a second subset of the plurality of survey questions to one or more respective computing devices associated with at the least one survey participant based on the identification information.

16. The method of claim 15, comprising:

receiving respective answers associated with the respective survey questions of the second subset from the one or more respective computing devices; and generating a post-incident report comprising:
  at least a portion of the incident data;
  the respective retrieved answers to the first subset; and
  at least a portion of the respective received answers to the second subset.

17. The method of claim 15, wherein generating the post-incident survey is performed in response to to receiving an alert indicating that the incident has been resolved.

18. The method of claim 15, comprising:

transmitting the first subset of the plurality of survey questions with the second subset, wherein the first subset of the plurality of survey questions is auto-populated with the respective retrieved answers before being transmitted.

19. The method of claim 18, comprising receiving respective confirmation of the respective retrieved answers from the one or more respective computing devices.

20. The system of claim 1, wherein the incident data is received from a configuration management database associated with the communications network.

\* \* \* \* \*